US007268674B2

(12) United States Patent
Bohler et al.

(10) Patent No.: US 7,268,674 B2
(45) Date of Patent: Sep. 11, 2007

(54) REMOTE DUMMY LOAD

(75) Inventors: Christopher L. Bohler, North Royalton, OH (US); Louis Brunet, Ile des Soeurs (CA)

(73) Assignee: GELcore LLC, Valley View, OH (US)

( * ) Notice: Subject to any disclaimer, the term of this patent is extended or adjusted under 35 U.S.C. 154(b) by 70 days.

(21) Appl. No.: 11/043,371

(22) Filed: Jan. 26, 2005

(65) Prior Publication Data

US 2006/0176187 A1 Aug. 10, 2006

(51) Int. Cl.
*B60R 25/10* (2006.01)
*G08G 1/095* (2006.01)

(52) U.S. Cl. .................................. 340/426.25; 340/907

(58) Field of Classification Search ..... 340/907–932.1, 340/426.25; 315/129–136; 361/272, 274.1, 361/274.3

See application file for complete search history.

(56) References Cited

U.S. PATENT DOCUMENTS 5,252,969 A * 10/1993 Kishi ......................... 340/908
6,127,784 A 10/2000 Grossman et al.
6,452,803 B1 * 9/2002 Liu ............................ 361/704
6,762,563 B2 * 7/2004 St-Germain et al. ........ 315/129
7,014,225 B1 * 3/2006 Goodsel et al. ............. 285/364
2004/0070519 A1 4/2004 Wu et al.
2006/0051093 A1 * 3/2006 Manna ........................ 398/79

FOREIGN PATENT DOCUMENTS

AU 30982 84 1/1985
WO WO97/26483 7/1997
WO WO 2004/075606 9/2004
WO WO 2005/038476 * 4/2005

OTHER PUBLICATIONS

PCT/US2005/002743, PCT International Search Report, 2005.

* cited by examiner

*Primary Examiner*—Benjamin C. Lee
*Assistant Examiner*—Jennifer Mehmood
(74) *Attorney, Agent, or Firm*—Fay Sharpe LLP

(57) ABSTRACT

The inventive dummy load is mounted on the input power cables of a traffic signal while managing the heat load generated by either a resistive and/or capacitive load. Using the inventive dummy load, there is no thermal path back to the light emitting diode (LED) board. The inventive dummy load may be easly installed, removed, or replaced. The dummy load can be retrofit to adapt to a new controller, either by adding to or replacing the dummy load after initial installation or by removing part or all of the dummy load. There is no need to breach the sealed lamp to adjust the dummy load. Thus, field-adjustments can be made. Further, the number of parts required to manufacture lamps for a variety of retrofit applications are reduced, which in turn reduces the cost and complexity of the lamp.

15 Claims, 3 Drawing Sheets

PRIOR ART

REMOTE DUMMY LOAD

BACKGROUND OF THE INVENTION

1. Field of the Invention

This invention relates to impedance "dummy" loads for light emitting diode (LED) traffic signals. More specifically, it relates to adding in-line resistive or capacitive loads to LED traffic signals to make them compatible with traffic signal controllers that were designed to work with higher power consumption incandescent light sources.

2. Description of Related Art

Existing incandecant traffic signal controllers have minimum power load requirements. When the power load is above the minimum level, the controller recognizes that there is a signal on the line. Light emitting diode (LED) traffic signals can operate at less than this threshold value. Thus, when a LED signal is retrofit into an existing signal with a controller developed for an incandecsant lamp, there must be an artificial means of creating the additional load to meet this minimum threshold value.

In prior art LED signals, a resistive load is mounted on the back of the traffic signal lamp cover and wired to the existing circuitry in such a way as to create an additive load to the existing LED array. The prior art dummy load is attached either by bolting it onto the back cover or building it into the housing.

This approach creates additional heat in the system, which can cause premature aging of the LEDs and other electronic components in the system. In addition, assembly time on the manufacturing floor is increased and more parts are required to address various load configurations. There is a need for a system which does not cause premature aging of the LEDs and/or other electrical components. Further, a system which reduces the number of parts needed is desireable.

Prior art LED signals must be manufactured with the desired dummy load matching the controller. There is a need for a system which allows a dummy load to be added, removed and/or adjusted in the field.

SUMMARY OF THE INVENTION

The invention provides an off-lamp dummy load that minimizes the impact of heating. The inventive dummy load configuration reduces assembly cost, complexity and the number of parts associated with dummy load production. Further, the inventive dummy load provides the customer with the ability to field-modify the traffic signal.

The inventive dummy load is preferrably a quick connect design that allows the dummy load to be mounted on the input power cables to the signal while managing the heat load generated by either a resistive and/or capacitive load.

There are several advantages to the inventive dummy load. There is no thermal path back to the LED board. The dummy load may be easily installed, removed, or replaced. The dummy load can be retrofit to adapt to a new controller, either by adding or replacing the dummy load after initial installation or by removing the dummy load, all without having to breach the sealed lamp. The number of parts required to manufacture the lamp is reduced which reduces the cost and complexity of the lamp.

DETAILED DESCRIPTION OF THE INVENTION

This invention relates to adding loads, preferably resistive or capacitive loads, to light emitting diode (LED) traffic signals to make them compatible with existing traffic signal controllers which were designed to work with higher power consumption incandescent light sources. For safety reasons, it is critical that a controller be able to control the LED lights signal.

Existing incandescent traffic signal controllers have minimum power load requirements. When the power load is above the minimum level, the controller recognizes that there is a signal on the line. Light emitting diode (LED) traffic signals can operate at less than this threshold value. Thus, when a LED signal is retrofit into an existing signal with a controller developed for an incandescent lamp, there must be an artificial means of creating the additional load so that the controller will recognize there is a signal on the line.

Dummy loads are often added to an existing traffic signal in the situation where a traffic controller expects to see an incandescent type of load. Typically greater than 20 W when the lamp is lit. Because LEDs are of much lower power consumption due to their better efficiency, compared to incandescent lamps, LED traffic signal lamps have lower power consumptions. Some LED signals have loads as low as 6 W. Therefore, additional loads, often referred to as "dummy loads," are required to make the lamp compatible with the traffic controller.

Figure 1:
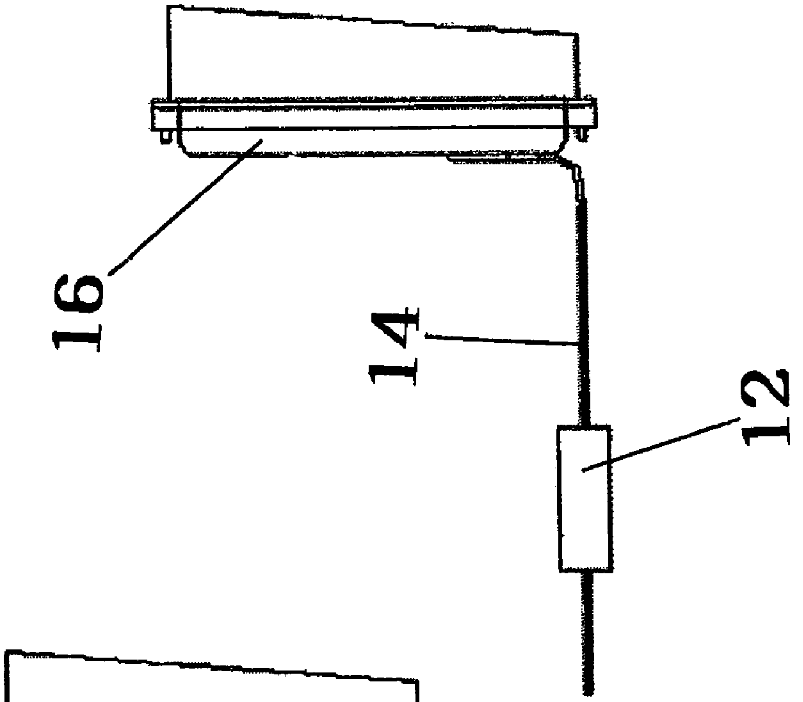
FIG. 1 is a signal with the inventive dummy load.
Figure 2:
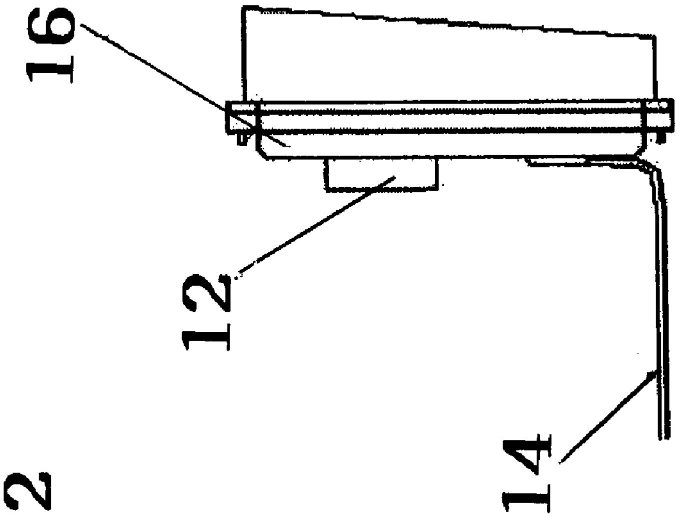
FIG. 2 is a signal with a prior art dummy load.

A prior art dummy load is shown in FIG. 2. The dummy load 12 in existing designs is either fastened to the lamp, typically to the back surface of the housing 16 or integrated into the electronics solution on-board, sometimes with an overmolded heat sink.

The inventive dummy load configuration allows a standard LED traffic signal lamp used for new installations to also be used for retrofit applications. It further allows the dummy load to be adjusted in the field. As a result, the controller can be changed if needed. Alternatively, the signal lamp could be moved between locations. The inventive dummy load 12 can be installed at the point of manufacture, at the time the signal is installed, or it can be installed, adjusted, increased, reduced or removed at the time when traffic controller or other piece of equipment or circuitry is changed.

There are a number of potential embodiments associated with the attachment of the dummy load to the input power cables. In the preferred embodiment, the dummy load is attached to the power cable 14 remote from the housing. This isolates the LED and LED circuitry from the heat generated by the dummy load. The power cable 14 can be any known power cable, such as multi-wire input or two-conductor cable 14. The dummy load 12 can be attached by any known method including clam shell with pigtail, insulation displacement connector (IDC), and male-female quick connect/disconnect connectors such as press-fit spade and slip-fit fin connectors. The load 12 can be added either serially or in parallel depending upon the passive or active nature of the load 12 and whether it is a resistive or capacitive load.

The inventive dummy load design allows the dummy load to be field adjusted. A dummy load can be added, removed, additional dummy loads can be added or removed to obtain a desired load. For example, a dummy load of 12 W might be added to the system. If, for example, at a later time it becomes desireable to change the controller, a new signal lamp is not required; the installer can simply adjust the dummy load.

Figure 3:
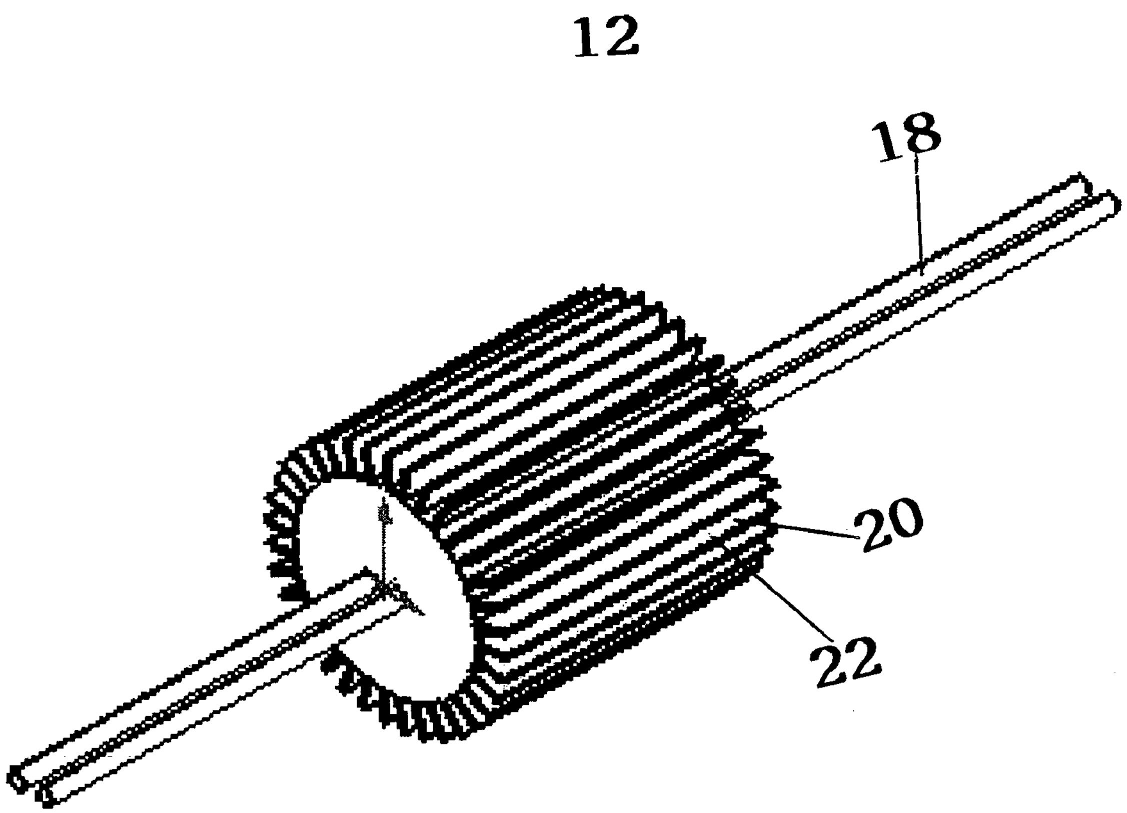
FIG. 3 is a clamshell or IDC dummy load with a heat sink.

FIG. 3 illustrates an example of a clam shell or IDC approach for a multi-wire input wire pair 18. The configuration includes a heatsink 20 to draw the heat generated by the resistive load, in particular, out of the module. There is a thermal path for heat flow from the load to the heatsink either using direct contact or thermal interfaces such as adhesives or tape, while maintaining electrical isolation from the outside world. The embodiment shown in FIGS. 3 and 4 are radial fin 22 heatsink 20, but other heat sinks designs known in the art may be used as well.

The preferred embodiment uses passive components such as resistors or capacitors. However, alternating passive and active loading configurations are possible. Both the resistive and capacitive loads can comprise either a single component or multiple components. As an example, a single 5 W power resistor could be incorporated serially or broken up into multiple smaller resistors. Various electrical configurations may be used to obtain the appropriate load conditions required. The appropriate dummy load depends on the controller, the LED array, and any other load in the system.

Figure 4:
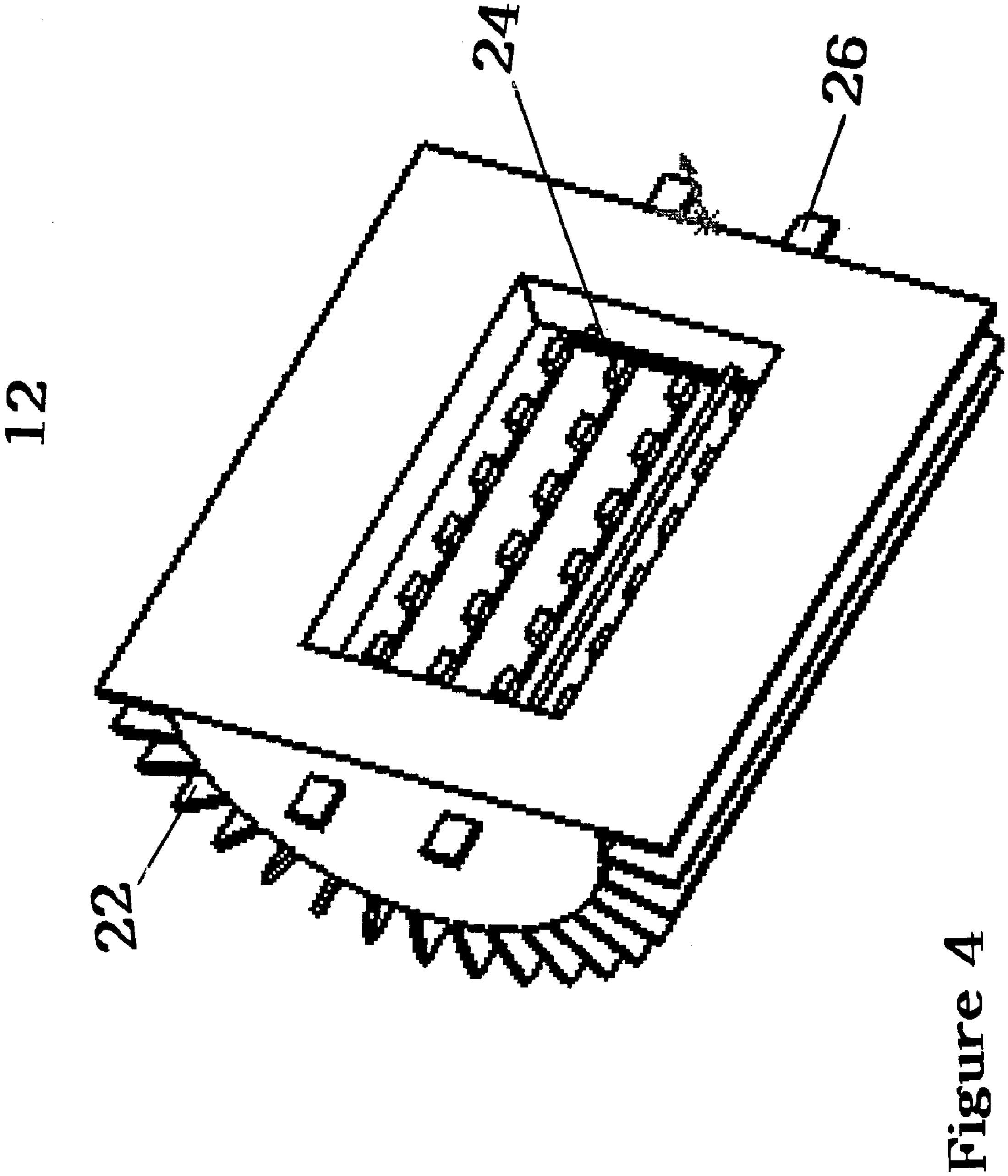
FIG. 4 is a cross section of a dummy load with a heat sink.

An example of a multi-resistor 24 configuration is shown in cross-section in FIG. 4. Resistors 24 are shown as blocks but can be any types of resistive loads including wire wound, carbon. The resistive elements thermally contact the heatsink. The electrical contacts in this case are male spade connectors 26; however, any know connectors can be used.

We claim:

1. A traffic signal comprising:

a traffic signal housing, electronics and an LED array inside the housing, a power cable to power the LED array, wherein at least a portion of the power cable is outside the housing, and a dummy load integrally connected to and supported by the power cable remote from the housing.

2. The traffic signal of claim 1 wherein the dummy load is removeably connected to the power cable.

3. The traffic signal of claim 1 further comprising a heat sink, wherein the dummy load is connected to the heat sink.

4. The traffic signal of claim 2 further comprising a heat sink, wherein the dummy load is connected to the heat sink and the heat sink and dummy load are removeably connected to the power cable.

5. The traffic signals of claim 1 wherein the dummy load is connected to the power cable using quick connect/disconnect connectors.

6. The traffic signal of claim 1 wherein the dummy load is connected to the power cable using a clamshell type connector or an insulation displacement connector.

7. The traffic signal of claim 3 wherein the heat sink is in direct thermal contact with the dummy load.

8. The traffic signal of claim 3 wherein there is a thermal interface between the dummy load and the heat sink.

9. The traffic signal of claim 1 wherein the power cable is a two-conductor cable.

10. The traffic signal of claim 1 wherein the power cable is a multi-wire input wire pair.

11. The traffic signal of claim 1 wherein the dummy load comprises a capacitive load.

12. The traffic signal of claim 1 wherein the dummy load comprises a resistive load.

13. The traffic signal of claim 1 wherein the dummy load comprises active and passive loads.

14. The traffic signal of claim 3 wherein the heat sink comprises a plurality of radial fins.

15. A method of retrofitting a traffic signal, comprising the steps of:

determining a desired dummy load based on at least one of a controller, a light array and any existing loads, adding, removing or replacing a dummy load integrally attached to and supported by a power cable of the traffic signal via an insulation displacement connector to achieve the desired dummy load.

* * * * *